(12) United States Patent
Shirasaki et al.

(10) Patent No.: US 7,683,125 B2
(45) Date of Patent: Mar. 23, 2010

(54) METHOD FOR PRODUCING SILICONE RUBBER, AQUEOUS EMULSION FOR SILICONE RUBBER, AND METHOD FOR PRODUCING SAME

(75) Inventors: Shinya Shirasaki, Fukui (JP); Tadanori Fukamachi, Awara (JP); Mitsuo Hamada, Kisarazu (JP)

(73) Assignee: Dow Corning Toray Company, Ltd., Tokyo (JP)

(*) Notice: Subject to any disclaimer, the term of this patent is extended or adjusted under 35 U.S.C. 154(b) by 908 days.

(21) Appl. No.: 10/546,746

(22) PCT Filed: Feb. 24, 2004

(86) PCT No.: PCT/JP2004/002109

§ 371 (c)(1),
(2), (4) Date: Jul. 27, 2006

(87) PCT Pub. No.: WO2004/074378

PCT Pub. Date: Sep. 2, 2004

(65) Prior Publication Data

US 2007/0015868 A1 Jan. 18, 2007

(30) Foreign Application Priority Data

Feb. 24, 2003 (JP) ............................. 2003-046165
Feb. 10, 2004 (JP) ............................. 2004-033560

(51) Int. Cl.
D21H 19/32 (2006.01)
(52) U.S. Cl. ................... 524/861; 524/862; 524/588; 524/837; 528/15; 528/32; 528/33
(58) Field of Classification Search ................. 427/387; 524/837, 588, 861–862; 528/15, 32–33
See application file for complete search history.

(56) References Cited

U.S. PATENT DOCUMENTS

| | | | |
|---|---|---|---|
| 4,248,751 A | 2/1981 | Willing | |
| 4,391,921 A | 7/1983 | Johnson | |
| 4,545,914 A | 10/1985 | Graiver et al. | |
| 4,547,312 A | 10/1985 | Graiver et al. | |
| 4,791,029 A | 12/1988 | Fau et al. | |
| 4,954,554 A | 9/1990 | Bunge | |
| 5,332,762 A | 7/1994 | Maschberger et al. | |
| 6,491,980 B1 | 12/2002 | Müller et al. | |
| 2002/0061365 A1 | 5/2002 | Grape | |

FOREIGN PATENT DOCUMENTS

| | | |
|---|---|---|
| EP | 0 542 498 | 5/1993 |
| EP | 0 832 914 | 4/2002 |
| JP | 56-036546 | 4/1981 |
| JP | 59-012832 | 1/1984 |
| JP | 61-066753 | 4/1986 |
| JP | 61-066754 | 4/1986 |
| JP | 63-006053 | 1/1988 |
| JP | 2-248463 | 10/1990 |
| JP | 5-222292 | 8/1993 |
| JP | 06128553 A | 5/1994 |
| JP | 7-122000 | 12/1995 |
| JP | 10-060283 | 3/1998 |
| JP | 10-152563 | 6/1998 |
| JP | 2000-169590 | 6/2000 |
| JP | 2000-169704 | 6/2000 |
| JP | 2000-178448 | 6/2000 |
| JP | 2002-114860 | 4/2002 |
| JP | 2004-091569 | 3/2004 |
| JP | 2004-143332 | 5/2004 |

OTHER PUBLICATIONS

English language Abstract for JP 2-248463 extracted from espacenet.com database dated Aug. 15, 2005.

English language Abstract for JP 5-222292 extracted from espacenet.com database dated Aug. 15, 2005.

English language Abstract for JP 7-122000 extracted from espacenet.com database dated Feb. 25, 2006.

English language Abstract for JP 10-060283 extracted from espacenet.com database dated Aug. 15, 2005.

(Continued)

*Primary Examiner*—Randy Gulakowski
*Assistant Examiner*—Olatunde S Ojurongbe
(74) *Attorney, Agent, or Firm*—Howard & Howard Attorneys PLLC

(57) ABSTRACT

A method of manufacturing a silicone rubber comprises a first stage and a second stage. The first stage comprises (1-1) the step of preparing an aqueous dispersion composed of water that contains a water-soluble polymer (E), a finely powdered silica filler (B), a conductive filler (C), and a non-conductive inorganic filler (D) and (1-2) the step of preparing an aqueous emulsion by stirring and mixing the obtained aqueous dispersion with the following components: an organopolysiloxane (A) that contains silicon-bonded alkenyl groups, an emulsification agent (F), and a curing agent (G). The second stage obtains the silicon rubber either (2-1) by curing the aqueous emulsion prepared in the aforementioned first stage, forming a wet silicone-rubber like cured body, and then removing water from the aforementioned wet silicone-rubber like cured body; or (2-2) by dehydrating and curing the aqueous emulsion prepared in the aforementioned first stage.

18 Claims, No Drawings

OTHER PUBLICATIONS

English language Abstract for JP 10-152563 extracted from espacenet.com database dated Aug. 15, 2005.
English language Abstract for JP 56-036546 extracted from espacenet.com database dated Aug. 15, 2005.
English language Abstract for JP 59-012832 extracted from espacenet.com database dated Aug. 15, 2005.
English language Abstract for JP 61-066753 extracted from espacenet.com database dated Aug. 15, 2005.
English language Abstract for JP 61-066754 extracted from espacenet.com database dated Aug. 15, 2005.
English language Abstract for JP 63-006053 extracted from espacenet.com database dated Aug. 15, 2005.
English language Abstract for JP 2000-169590 extracted from espacenet.com database dated Aug. 15, 2005.
English language Abstract for JP 2000-169704 extracted from espacenet.com database dated Aug. 15, 2005.
English language Abstract for JP 2000-178448 extracted from espacenet.com database dated Aug. 15, 2005.
English language Abstract for JP 2002-114860 extracted from espacenet.com database dated Aug. 15, 2005.
English language Abstract for JP 2004-091569 extracted from espacenet.com database dated Aug. 16, 2005.
English language Abstract for JP 2004-143332 extracted from espacenet.com database dated Aug. 16, 2005.
English language Abstract for JP 06128553 A, publication date May 10, 1994, extracted from Japanese Patent Office, Patent Abstracts of Japan database.

METHOD FOR PRODUCING SILICONE RUBBER, AQUEOUS EMULSION FOR SILICONE RUBBER, AND METHOD FOR PRODUCING SAME

RELATED APPLICATIONS

This application claims priority to and all the advantages of International Application No. PCT/JP2004/002109, filed on Feb. 24, 2004, which claims priority to Japanese Patent Application No. JP2003-046165, filed on Feb. 24, 2003 and Japanese Patent Application No. JP2004-033560, filed on Feb. 10, 2004.

TECHNICAL FIELD

The present invention relates to a method for manufacturing a silicone rubber from an aqueous emulsion. The invention also relates to the aforementioned aqueous emulsion intended for this purpose, and to a method of preparation of such an emulsion.

BACKGROUND ART

Liquid silicone rubber compositions that are turned into non-conductive or conductive rubber-like structures when cured by a hydrosilation reaction are known in the art and find wide application in the manufacture of various parts used in electrical, electronic, construction, machine, and other fields. A non-conductive liquid silicone rubber base, which is one of the main components of a non-conductive silicone rubber composition, is prepared by compounding an alkenyl-containing organopolysiloxane with reinforcement silica filler, if necessary, with an addition of a non-conductive inorganic filler. On the other hand, a conductive liquid silicone rubber base, which is one of the main components of a conductive liquid silicone rubber composition, is prepared by compounding an alkenyl-containing organopolysiloxane with a conductive filler, if necessary, with an addition of a non-conductive inorganic filler.

In a majority of cases, these starting materials are produced in a batch mode by uniformly mixing them in a double arm mixer, Henschel mixer, planetary mixer, etc., or in a continuous process by continuously loading an alkenyl-containing organopolysiloxane and a filler into a double-screw extruder, where the components are mixed with heating and wherefrom the mixture is extruded in a continuous flow (see Japanese Patent Publication H4-280082). Japanese Unexamined Patent Application Publication [hereinafter "Kokai"] H10-152563 discloses a method for preparation of a liquid silicone rubber base by mixing and distributing a finely powdered conductive filler, such as a carbon black, with a liquid alkenyl-containing organopolysiloxane in a continuous mixing apparatus having a rotary disk that rotates with high speed. Since preparation of such a liquid silicone rubber base occurs at a high temperature caused by procedural heating or friction heating, the obtained liquid silicone rubber base cannot be used directly after the preparation since, prior to curing, it should be cooled to room temperature and then compounded with a cross-linking agent and a curing catalyst. Japanese Patent Publication H07-122000 describes a method for manufacturing a silicone elastomer sponge by curing a mixture of an organopolysiloxane and a curing agent in a silicone rubber base with a foaming agent prepared from an aqueous emulsion that is composed of an emulsification agent, water, and a thickener. However, the cross-linking agent and the curing catalyst have to be added after cooling the silicone rubber base to room temperature, and thus [as in the previously described method] the silicone rubber base cannot be used immediately after the preparation.

On the other hand, a method of manufacturing a silicone rubber sponge from an aqueous emulsion described in Kokai S59-12832 consists of freezing, then thawing and drying a silicone emulsion of a condensation curing type that comprises a hydroxyl end-blocked polydiorganosiloxane, an organic tin catalyst, and a colloidal silica. In addition to an organic amine, thickener, and colloidal silica, the aforementioned emulsion may also be mixed with fillers besides the colloidal silica. However, the process described in the aforementioned publication has a low efficiency as it is time-consuming and requires a large amount of energy to be spent on freezing, thawing, and drying the emulsion.

Kokai 2000-169590 describes a method of manufacturing an elastomer by preparing an aqueous emulsion/dispersion by mixing an aqueous emulsion of a hydrosilation-curable silicone composition with an aqueous dispersion of an adhesion accelerator, silicone resin, and carbon black and applying the obtained emulsion/dispersion onto a fabric substrate as a coating which is then cured. A problem associated with the above method is difficulty of dispersing carbon black in an aqueous medium. Kokai 2002-114860 discloses a method of manufacturing a silicone rubber sponge by heating and curing a mixture composed of a silicone rubber base prepared from an alkenyl-containing polyorganosiloxane and a reinforcement silica filler, a polyorganohydrogen siloxane, a platinum catalyst or an organic peroxide, and a foaming agent composed of a gelatinized water-absorbing polymer that absorbs only water or water with an emulsification agent. However, the gelatinized water-absorbing polymer is extremely viscous and stirring and mixing thereof with other components requires application of very high loads to mixing equipment.

BRIEF SUMMARY OF THE INVENTION

It is an object of the present invention to provide a novel method for manufacturing silicone rubber compositions that is free of the above-described problems of the prior art. It is another object of the invention to provide an aqueous emulsion for use in the preparation of the above-mentioned silicone rubber compositions, and a method for the preparation of such an emulsion. More specifically, the invention provides such a method for manufacturing a silicone rubber composition that makes it possible to decrease loads applied to a mixer during stirring and mixing of the silicone rubber composition components and allows curing of the aforementioned silicone rubber composition directly after the preparation. The invention also provides an aqueous emulsion for use in the manufacture of silicone rubber and to a method for the preparation of the aforementioned emulsion.

More specifically, the invention relates to a method of manufacturing a silicone rubber comprising: a first stage that comprises (1-1) the step of preparing an aqueous dispersion of a filler composed of 10 to 300 part by weight of water that contains a water-soluble polymer (E), 1 to 40 part by weight a finely powdered silica filler (B), 0 to 500 part by weight of a conductive filler (C), and 0 to 500 part by weight of a non-conductive inorganic filler (D) (excluding the finely powdered silica filler), where the total amount of components (B), (C), and (D) is within the range of 1 to 500 part by weight; and (1-2) the step of preparing an aqueous emulsion by stirring and mixing in an arbitrary sequence the aforementioned aqueous dispersion of a filler with the following components: 100 part by weight of an organopolysiloxane (A) that contains in one molecule at least two silicon-bonded alkenyl groups and that has a viscosity of 100 to 500,000 mPas at 25° C.; 0.1 to 10 part by weight of an emulsification agent (F); and a curing agent (G); and a second stage for obtaining a silicone rubber, the second stage comprising (2-1) curing the aqueous emulsion prepared in the aforementioned first stage, forming a wet silicone rubber-like cured body, and then removing water from the aforementioned wet silicone rubber-like cured body; or (2-2) dehydrating and curing the aqueous emulsion prepared in the aforementioned first stage.

The invention also relates to the aqueous emulsion for use in the production of the silicone rubber and a method of preparing the aqueous emulsion.

DETAILED DESCRIPTION OF THE INVENTION

Organopolysiloxane (A) that contains in one molecule at least two silicon-bonded alkenyl groups has a viscosity of 100 to 500,000 mPa·s at 25° C. and is used in the aforementioned aqueous silicone rubber emulsions for the production of silicone rubber, in the first stages, and in the emulsion manufacturing method is one of the main components of the emulsion for the preparation of the silicone rubber. At least two silicon-bonded alkenyl groups in one molecule of the organopolysiloxane are needed for curing. The aforementioned alkenyl groups can be represented by vinyl, allyl, propenyl groups, etc. Organic groups other than alkenyl groups may be represented by methyl, ethyl, propyl, or similar alkyl groups; phenyl, tolyl or similar aryl groups; 3,3,3-trifluoropropyl, 3-chloropropyl groups, or similar halogenated alkyl groups. Methyl groups are preferable. The organopolysiloxane may have a linear, or a partially branched linear molecular structure. In order to facilitate emulsification in water, the organopolysiloxane should have a viscosity of 100 to 500,000 mPa·s. The organopolysiloxane may be of two or more types with different numbers of alkenyl groups, different substituents, and different viscosities.

Finely powdered silica filler (B) used in the aforementioned aqueous silicone rubber emulsions for the production of silicone rubber, in the first stages, and in the emulsion manufacturing method imparts either an appropriate thickness to the emulsion, or a mechanical strength to the cured silicon rubber product. The aforementioned finely powdered silica filler that is used for reinforcement can be exemplified by fumed silica, precipitated silica, or the aforementioned silicas which are hydrophobized with organochlorosilanes such as dimethyldichlorosilane or trimethylchlorosilane, organosiloxane oligomers such as octamethylcyclotetrasiloxane or a dimethylsiloxane oligomer capped at both molecular terminals with silanol groups, or hexamethyldisilazane. The aforementioned finely powdered fillers should have a specific surface area exceeding 50 m²/g. Since the thickness of the emulsion will depend on the added amount of component (B), it is recommended to add this component in an amount of 1 to 40 parts by weight per 100 parts by weight of component (A).

Conductive filler (C) that may be used in the aforementioned aqueous silicone rubber emulsions for the production of silicone rubber, in the first stages, and in the emulsion manufacturing method is not an indispensable component of the composition of the invention, but, if necessary, it can improve the effect of conductivity of the silicone rubber, and therefore the use of this component may be desirable. Typical representatives of conductive filler (C) are a conductive furnace black (CF), super-conductive furnace black (SCF), extra-conductive furnace black (XCF), conductive channel black (CC), furnace black heat-treated at high temperature of 1500° C., channel black, acetylene black, graphite, and carbon fibers. Another filler suitable for use as component (C) is a fine metal powder, e.g., of gold, silver, nickel, copper, aluminum. iron, cobalt, nickel, etc. Component (C) may be used in an amount of 0 to 500 parts by weight per 100 parts by weight of component (A). If it is added in an amount exceeding 500 parts by weight, the composition will become too viscous and difficult to emulsify.

Non-conductive inorganic filler (D) (excluding the finely powdered silica filler) that may be used in the aforementioned aqueous silicone rubber emulsions for the production of silicone rubber, in the first stages, and in the emulsion manufacturing method is not an indispensable component of the composition of the invention, but if necessary, it may be used in combination with component (B) for improving such effects as flame-retarding properties, resistance to heat, heat conductive properties, magnetic properties, catalytic properties, resistance to ageing, electrical insulation, ceramization, etc. Typical representatives of the aforementioned non-conductive inorganic filler are the following: aluminum oxide, magnesium oxide, calcium oxide, boron oxide, barium oxide, zirconium oxide, iron oxide, cerium oxide, lanthanum oxide, titanium oxide, bismuth oxide, tin oxide, or similar finely powdered metal oxides; cobalt bismuth iron oxide, barium zirconium oxide; quartz, diatomaceous earth, sericite, kaolin, zeolite, tourmaline, apatite, or similar natural or synthetic mineral powders; titanium carbide, aluminum carbide, tungsten carbide, zirconium carbide, or a similar metal carbide powder; silicon nitride, aluminum nitride, chromium nitride, zirconium nitride, or a similar metal nitride powder; silicon carbide fibers, alumina short fibers, potassium titanium oxide fibers, glass fibers, or similar inorganic fibers; lead carbonate, manganese carbonate, calcium carbonate, magnesium carbonate, or a similar metal carbonate powder; aluminum hydroxide, calcium hydroxide, bismuth hydroxide, or a similar metal hydroxide powder; micro-balloons of borosilicate, and Shirasu balloons, or a similar hollow ceramic powder. The aforementioned powders can be used individually or in combinations of two or more. The aforementioned non-conductive inorganic filler may be used in an amount of 0 to 500 parts by weight per 100 parts by weight of component (A). If it is used in an amount exceeding 500 parts by weight, the composition becomes too viscous and difficult to emulsify.

The total amount of components (B), (C), and (D) should be within the range of 1 to 500 parts by weight. If they are added in an amount of less than 1, the effect of thickening will not be achieved, and if they are added in an amount exceeding 500 parts by weight, the composition will become too viscous and difficult to emulsify.

For the preparation of the silicone emulsion, water that contains water-soluble polymer, also referred to throughout as component (E), is used in the aforementioned aqueous silicone rubber emulsions for the production of silicone rubber, in the first stages, and in the emulsion manufacturing method is an indispensable component. There are no special restrictions with regard to the water used for the purposes of the invention, provided that it is pure. This may be tap water, well water, ion-exchange water, or distilled water. Component (E) should be used in an amount of 10 to 300 parts by weight, preferably 50 to 200 parts by weight per 100 parts by weight of component (A). If it is added in an amount of less than 10 parts by weight, the share of the components (B), (C), and (D) or (C) and (D) will become too high, and if it is used in an amount exceeding 300 parts by weight, this will impair mechanical strength in the obtained cured silicone rubber product.

The water-soluble polymer of component (E) is used for adjusting the flowability of the aqueous emulsion and increases viscosity of the emulsion when added to water. The water-soluble polymer allows preparation of the emulsion even with small amounts of the emulsification agent (F) and is efficient in delaying or completely preventing precipitation or floatation of the filler. It should be added in an amount of 0.1 to 5 wt. %, preferably, 0.5 to 3 wt. % per amount of water. If the aforementioned polymer is added in an amount of less than 0.1 wt. %, the aqueous solution will have low viscosity, and it will be difficult to obtain a stable emulsion. On the other hand, if the polymer is added in an amount exceeding 5 wt. %, the emulsion will become too viscous, and it will be difficult to deaerate the emulsion. Therefore, the use of the aforementioned water-soluble polymer is desirable in any case.

The water-soluble polymer of component (E) may be exemplified by an alginic acid, sodium alginate, a sodium salt of a carboxylate, a sodium salt of a carboxy cellulose; a methyl cellulose, ethyl cellulose, hydroxyethyl cellulose, or a similar cellulose ether; a modified starch; polyvinyl alcohol; sodium polyacrylate; sodium polymethacrylate, etc. The higher is the viscosity acquired by the emulsion due to dissolving of the polymer in water, the better are the results.

A mixer suitable for uniformly dissolving the water-soluble polymer in water may comprise, e.g., a commercial juicer mixer, planetary mixer, Hobart mixer, homo-mixer, Henschel mixer, etc. It is recommended to use component (E) in the form of an aqueous solution obtained by uniformly dissolving the water-soluble polymer in water.

Emulsification agent (F) used in the aforementioned aqueous silicone rubber emulsions for the production of silicone rubber, in the first stages, and in the emulsion manufacturing method is added to the composition for emulsification of the organopolysiloxane and for forming a stable aqueous emulsion. There are no special restrictions with regard to the type of the emulsification agent, but, in general, it is more preferable to add an emulsification agent of a non-ionic type. A non-ionic surface-active agent used as the aforementioned non-ionic emulsification agent may be exemplified by a polyoxyethylene alkyl ether, polyoxyethylene phenyl ether, ethyleneglycol monofatty acid ester, propyleneglycol monofatty acid ester, sorbitane monofatty acid ester, polyoxyethylene monofatty acid ester, polyoxyethylene propyleneglycol fatty acid ester, or POE polyhydric alcohols. These emulsification agents can be used individually, or in combination of two or more. The HLB value of the emulsification agents should be within the range of 6 to 14. The use of two or more types of different emulsification agents is preferable.

Since component (E) possesses high viscosity, component (F) can be added in much smaller amounts. It is recommended to add component (F) in the amount of 0.1 to 10 parts by weight, preferably 0.5 to 7 parts by weight per 100 parts by weight of component (A). If component (F) is added in an amount of less than 0.1 parts by weight, it will be difficult to prepare a stable emulsion used for the manufacture of a silicone rubber. If, on the other hand, the amount of added component (F) exceeds 10 parts by weight, this will reduce heat-resistance properties in a silicone rubber product obtained by curing.

Curing agent (G) used in the aforementioned aqueous silicone rubber emulsions and in the first stages of the emulsion manufacturing methods is added in an amount sufficient for curing the aqueous emulsion used for silicon rubber production. A platinum type catalyst is used, preferably, in combination with an organopolysiloxane that contains silicon-bonded hydrogen atoms. The platinum type catalyst can be represented by a fine platinum powder, platinum black, chloroplatinic acid, alcohol-modified chloroplatinic acid, a complex of olefin with chloroplatinic acid, a complex of chloroplatinic acid with divinyltetramethyldisiloxane, rhodium compound, palladium compound, etc. It is recommended to add the platinum type catalyst in the amount of 1 to 200 parts by weight per 1,000,000 parts by weight of component (A). In the presence of the platinum type catalyst, the organopolysiloxane with silicon-bonded hydrogen atoms enters into an addition reaction with aforementioned component (A) and thus participates in curing of the composition. An appropriate organopolysiloxane with silicon-bonded hydrogen atoms may be represented by a methylhydrogenpolysiloxane having both molecular terminals capped with trimethylsiloxy groups, a dimethylsiloxane•methylhydrogensiloxane copolymer having both molecular terminals capped with trimethylsiloxy groups, a dimethylsiloxane•methylhydrogensiloxane copolymer having both molecular terminals capped with dimethylhydrogensiloxy groups, and a tetramethyltetrahydrogencyclotetrasiloxane. The organopolysiloxane with silicon-bonded hydrogen atoms is normally added in such an amount that provides a ratio of the mole number of silicon-bonded hydrogen atoms contained in this component to the mole number of alkenyl groups in component (A) within the range of (0.5:1) to (20:1). When an appropriate amount of component (G) is added to an aqueous emulsion for use in the manufacture of silicon rubber that is composed of 100 parts by weight of component (A), 1 to 40 parts by weight of component (B), 0 to 500 parts by weight of component (C), 0 to 500 parts by weight of component (D) excluding the finely powdered silica filler [where the total content of components (B), (C), and (D) is within the range of 1 to 500], 10 to 300 parts by weight of component (E), and 0.1 to 10 parts by weight of emulsification agent (F), the composition may gradually cure even at room temperature. Therefore, it is recommended to add an addition-reaction retarder. It is preferable to add such reaction retarder in an amount that inhibits curing at room temperature but allows curing with heating.

Component (G) may be first premixed with component (A). If necessary, the aqueous emulsions for use in the manufacture of silicone rubber may be further combined with adhesion promoting agents, diorganosiloxane oligomers, dyes, pigments, heat-resistant agents, fungicides, bactericides, etc.

The method of the invention for preparation of the aqueous emulsion used in the aforementioned aqueous silicone rubber emulsions for the production of silicone rubber, in the first stages, and in the emulsion manufacturing process may comprise (1-1) the step of preparing an aqueous dispersion of a filler composed of 10 to 300 parts by weight of water that contains a water-soluble polymer (E), 1 to 40 parts by weight a finely powdered silica filler (B), 0 to 500 parts by weight of a conductive filler (C), and 0 to 500 parts by weight of a non-conductive inorganic filler (D) excluding the finely powdered silica filler (where the total amount of components (B), (C), and (D) is within the range of 1 to 500 parts by weight); and (1-2) the step of preparing an aqueous emulsion by stirring and mixing in an arbitrary sequence the aforementioned aqueous dispersion of a filler with the following components: 100 parts by weight of an organopolysiloxane (A), 0.1 to 10 parts by weight of an emulsification agent (F); and a curing agent (G).

In the above method, the aforementioned filler dispersion is first prepared from 10 to 300 parts by weight of component (E), 1 to 40 parts by weight of component (B), 0 to 500 parts by weight of component (C), and 0 to 500 parts by weight of component (D) excluding the finely powdered silica filler (where the total amount of components (B), (C), and (D) is within the range of 1 to 500 parts by weight). The dispersion can be prepared by stirring and mixing the aforementioned components in a homomixer, colloidal mill, homodispersor, paddle mixer, 3-roll type mixer, etc., and then forming a uniform aqueous dispersion by dispersing the finely powdered silica filler, the conductive filler, and non-conductive inorganic filler in component (E). In view of the fact that component (B), such as colloidal silica, fumed silica, or a precipitated silica may be in an aqueous slurry form and already constitutes an aqueous dispersion, after adding to this component and uniformly dissolving in it an appropriate amount of a water-soluble polymer, it becomes possible to use the so-treated component (B) for the same function as component (E).

An aqueous emulsion is then prepared by combining the obtained aqueous filler dispersion, in an arbitrary order, with 100 parts by weight of component (A), 0.1 to 10 parts by weight of component (F), and component (G) and stirring and mixing the components. Stirring and mixing can be carried out in a high-shear type mixer that mechanically may consist of a rotor and stator, e.g., a homomixer, colloidal mixer, homodispersor, or a mixer that incorporated vacuum mixing and stirring functions.

The aforementioned aqueous dispersion of the filler, component (A), component (F), and component (G) may be loaded into a mixer simultaneously, if necessary, with premixing of the filler aqueous dispersion with component (F), and the composition is stirred and mixed. Alternatively, the mixer can be loaded with the aforementioned aqueous dispersion of the filler, component (A), and component (F), which are stirred and mixed, and the mixture is then combined with component (G) with subsequent stirring and mixing.

The method of the invention for preparation of the aqueous emulsion for use in the manufacture of silicon rubber along with the first stage of the aforementioned method may comprise: (3-1) the step of preparing an aqueous dispersion of a filler composed of 10 to 300 parts by weight of water that contains a water-soluble polymer (E), 1 to 40 parts by weight a finely powdered silica filler (B), 0 to 500 parts by weight of a conductive filler (C), and 0 to 500 parts by weight of a non-conductive inorganic filler (D) excluding the finely powdered silica filler (where the total amount of components (B), (C), and (D) is within the range of 1 to 500 parts by weight), and 0.1 to 10 parts by weight of an emulsification agent (F); and (3-2) the step of preparing an aqueous emulsion by stirring and mixing in an arbitrary sequence the aforementioned aqueous dispersion of a filler with the following components: 100 parts by weight of an organopolysiloxane (A); and a curing agent (G). Alternatively, the aforementioned aqueous emulsion can be prepared by a method comprising: (3-1) the step of preparing an aqueous dispersion of a filler composed of 10 to 300 parts by weight of water that contains a water-soluble polymer (E), 1 to 40 parts by weight of component (B), 0 to 500 parts by weight of component (C), and 0 to 500 parts by weight of component (D) excluding the finely powdered silica filler (where the total amount of components (B), (C), and (D) is within the range of 1 to 500 parts by weight), and 0.1 to 10 parts by weight of an emulsification agent (F); and (3-2) the step of combining the aforementioned filler aqueous dispersion with 100 parts by weight of component (A) with subsequent stirring and mixing of the obtained compound.

There are no special restrictions with regard to the mixer suitable for use in the aforementioned steps for stirring and mixing of the components, provided that this mixer makes it possible to uniformly disperse and emulsify the composition.

The second stage in the method of the invention for manufacture of silicone rubber may include obtaining a silicone rubber either (2-1) by curing the aqueous emulsion prepared in the aforementioned first stage, forming a wet silicone rubber-like cured body, and then removing water from the aforementioned wet silicone rubber-like cured body; or (2-2) by dehydrating and curing the aqueous emulsion prepared in the aforementioned first stage.

If the aforementioned first stage is accompanied by the formation of air bubbles in the aqueous emulsion for manufacture of silicone rubber, prior to the supply to the second stage, the product should be subjected to deaeration. The aqueous emulsion for the production of silicone rubber is normally cured at a temperature from room temperature to 120° C., preferably, from 50° C. to 100° C., to form a wet body of cured silicone rubber. The final silicone rubber is produced in the second stage by dehydrating the wet body of cured silicone rubber after a secondary heat treatment at 100° C. to 250° C. There are no special restrictions with regard to methods of molding of silicone rubber products that can be extruded, pressure-molded, injection-molded, dipping-molded, or applied as coatings. It is recommended to perform the secondary heat treatment in ovens with circulation of hot air or in hot-air heating furnaces. Alternatively, the aqueous emulsion for use in the manufacture of silicone rubber can be cured by gradual drying. This can be done, e.g., by blowing hot air onto the emulsion or heating the emulsion under a reduced pressure till completion of curing.

A silicone rubber product may have any convenient shape. It can be formed, e.g., into a sheet, film, plate, block, square rod, round rod, string, or a coating film. Similar to a conventional silicone rubber, the silicone rubber of the invention can be made in a sponged form.

PRACTICAL EXAMPLES

The invention will be further described in more detail with reference to practical and comparative examples. In the following description, all parts are parts by weight, all percentages are wt. %, and values of viscosity are those measured at 25° C.

Characteristics of silicone rubber and of emulsions for the production of the silicone rubber were measured as described below.

Emulsification Condition: The emulsification condition was evaluated visually.

Electric Current Developed in a Mixer During Operation: Electric current was measured on a T.K. homomixer (Model Mark II 2.5, the product of Tokushu Kika Kogyo Co., Ltd.) (single phase 100 V, rated current: 1.6 A) during stirring and mixing at 5000 rpm.

Volumetric Resistance: This characteristic was measured with the use of a tester as the volumetric resistance between electrodes 1 minute after squeezing a 2 mm-thick silicone rubber sheet between a metal plate electrode and a disk electrode having a diameter of 5 cm and a weight of 100 g.

Practical Example 1

An aqueous solution was prepared by adding 0.5% sodium polyacrylate to water, holding the content intact for 48 hours, and then mixing it manually and uniformly dissolving the sodium polyacrylate in the water. 50 parts of the obtained component (E) were combined with 1.0 part of a fumed silica having the specific surface of 200 $m^2/g$ [component (B)] and 10 parts of acetylene black with an average particle size of 35 nm [component (C)], and the composition was stirred and mixed for 5 min. in a T.K. homomixer (Mark II 2.5 type) at 5000 rpm. As a result, a uniform dispersion was produced.

The obtained dispersion was further combined with 100 parts by weight of a copolymer of a methylvinylsiloxane and a dimethylsiloxane having both molecular terminals capped with trimethylsiloxy groups and having a viscosity of 40,000 mPa·s (content of vinyl groups: 0.14%) [component (A)], 1.0 part of a polyoxyethylene dioleate having HLB value equal to 6.6 [component (F)], 1.0 part of a polyoxyethylene dioleate having HLB value equal to 8.4 [component (F)], 0.5 part of a polyoxyethylene dioleate having HLB value equal to 10.4, and then an aqueous emulsion was prepared by stirring and mixing the composition in a T.K. homomixer (Mark II 2.5 type) at 5000 rpm.

A plastic container was then filled with the following components: the aqueous emulsion; 1.0 part of a dimethylsiloxane•methylhydrogensiloxane copolymer capped at both molecular terminals with trimethylsiloxy groups (the content of silicon-bonded hydrogen atoms was 0.8%); 0.1 part of a complex of chloroplatinic acid and 1,3-divinyltetramethyldisiloxane (concentration of platinum was 0.4%) [component (G)], and 0.1 part of 3,5-dimethyl-1-hexyne (an addition reaction inhibitor) per 100 parts of the dimethylsiloxane•methylvinylsiloxane copolymer capped at both molecular terminals with trimethylsiloxy groups contained in the aforementioned emulsion. The components were manually stirred, and the mixture was deaerated with the use of a vacuum pump. The deaerated emulsion was poured into a 2 mm-sheet mold where it was formed into a wet silicone rubber sheet by heating for 10 min. under pressure at 90° C. The obtained silicone rubber sheet was placed into a 150° C. hot-air circulation type oven where it was dried for 1 hour to form a 2 mm-thick silicone rubber sheet. The electric current developed in the homomixer during emulsification and the volumetric resistance of the obtained silicone rubber were measured. The results of measurements are shown in Table 1. It can be seen from these results that in the method of the invention the current developed in the emulsion during emulsification is low, and that the volumetric resistance measured in the obtained silicone rubber also has a low value.

Practical Example 2

50 parts of the 0.5% aqueous solution of a sodium polyacrylate used in Practical Example 1 [component (E)] were combined with 1 part of a fumed silica having a specific surface area of 200 m$^2$/g [component (B)], 5 parts of an acetylene black with an average particle size of 35 nm [component (C)], and 15 parts of a quartz powder with an average particle size of 5 μm [component (D)]. A uniform aqueous dispersion was then prepared by stirring and mixing the components under the same conditions and with the same homomixer as in Practical Example 1. Furthermore, the obtained aqueous dispersion was combined with the same copolymer of a dimethylsiloxane•methylvinylsiloxane copolymer that was used in Practical Example 1 [component (A)] and with the same emulsifier as in Practical Example 1 [component (F)], and an aqueous emulsion was produced under the same conditions as in Practical Example 1. The same amount of a curing agent as in Practical Example 1 and the same amount of an addition reaction inhibitor as in Practical Example 1 were added to the obtained aqueous emulsion, the components were stirred and mixed, and a silicone rubber sheet was produced from the emulsion under the same conditions as in Practical Example 1. The electric current developed in the homomixer during emulsification and the volumetric resistance of the silicone rubber sheet were measured. The results of measurements are shown in Table 1.

Comparative Example 1

50 parts of a gel-like substance obtained by swelling in water a water-absorbing polymer in the form of a cross-linked product of partial sodium salt of an acrylic acid polymer (SANFRESH ST500D produced by Sanyo Chemical Industries, Ltd.) (with 0.2% of the aforementioned water-absorbing polymer) were combined with 1.0 part of a fumed silica having a specific surface area of 200 m$^2$/g [component (B)], and 2.0 parts of an acetylene black with an average particle size of 35 nm [component (C)]. An aqueous dispersion was then prepared by stirring and mixing the components for 5 min. in the same homomixer as in Practical Example 1 operating at 5,000 rpm. An aqueous emulsion was prepared under the same conditions as in Practical Example 1 by adding to the obtained dispersion the same dimethylsiloxane•methylvinylsiloxane copolymer and by using the same homomixer as in Practical Example 1. Following this, the emulsion was combined with the same amount of the same curing agent as in Practical Example 1 and with the same amount of the same addition reaction inhibitor as in Practical Example 1. The components were stirred and mixed, and then a silicone rubber sheet was produced under the same conditions as in Practical Example 1. The electric current developed in the homomixer and the volumetric resistance of the silicone rubber sheet were measured. The results of measurements are shown in Table 1. In spite of the fact that the filler was used in a small amount, the amount of the carbon black could not be increased because of a high value of electric current developed in the homomixer.

Comparative Example 2

An attempt was made to prepare an aqueous emulsion under the same conditions as in Practical Example 1, with the exception that water was used instead of the water-soluble polymer solution. However, a stable emulsion could not be prepared, and curing could not produce a wet silicone rubber body.

TABLE 1

|  | Pr. Ex. 1 | Pr. Ex. 2 | Comp. Ex. 1 | Comp. Ex. 2 |
|---|---|---|---|---|
| Dimethylsiloxane · methylvinyl-siloxane copolymer (parts) | 100 | 100 | 100 | 100 |
| Aqueous solution of sodium polyacrylate (parts) | 50 | 50 | — | — |
| Gel of water-absorbing polymer | — | — | 50 | — |
| Water (parts) | — | — | — | 50 |
| Fumed silica (parts) | 1.0 | 1.0 | 1.0 | 1.0 |

TABLE 1-continued

|  | Pr. Ex. 1 | Pr. Ex. 2 | Comp. Ex. 1 | Comp. Ex. 2 |
|---|---|---|---|---|
| Acetylene black (parts) | 10 | 5 | 2 | 10 |
| Quartz powder (parts) | — | 15 | — | — |
| Polyoxyethylene dilaurate (parts) | 1.0 | 1.0 | 1.0 | 1.0 |
| Polyoxyethylene dialeate (parts) | 1.0 | 1.0 | 1.0 | 1.0 |
| Polyoxyethylene dialeate (parts) | 0.5 | 0.5 | 0.5 | 0.5 |
| Emulsification condition | Good | Good | Good | No emulsification |
| Electric current (A) | 0.7 | 0.7 | 0.8 | — |
| Volumetric resistance (kΩ) | 1.4 | 7.5 | 30 | — |

As can be seen from Table 1, without the use of an aqueous solution of sodium polyacrylate, emulsification was not possible, and the current was high. This was associated with high loads during stirring and mixing, high volumetric resistance, and the insufficient effect of conductivity produced by the added conductive filler.

Practical Example 3

An aqueous solution was prepared by adding a 2.0% sodium polyacrylate to water, holding the contents intact for 48 hours, and then manually mixing the components to uniformly dissolving the sodium polyacrylate. 100 parts of the obtained 2.0% solution of the sodium polyacrylate [component (E)] were combined with 1.0 part of a fumed silica having a specific surface area of 200 m²/g [component (B)], 200 parts of an alumina powder having an average particle size of 2.5 μm [component (D)], and 10 parts of a boron oxide with an average particle size of 300 μm [component (D)]. A uniform aqueous dispersion was then prepared by stirring and mixing the components under the same conditions and with the same homomixer as in Practical Example 1. Furthermore, the obtained aqueous dispersion was combined with 100 parts of a dimethylpolysiloxane capped at both molecular terminals with dimethylvinylsiloxy groups and having a viscosity of 7,000 mPa·s (vinyl group content: 0.30%) [component (A)], 2.5 parts of a higher-alcohol type non-ionic surface-active agent having 10.5 HLB (the product of Sanyo Chemical Industries, Ltd.; SANNONIC SS50 [component (F)], and 2.5 parts of a higher-alcohol type non-ionic surface-active agent having 12.8 HLB (the product of Sanyo Chemical Industries, Ltd.; SANNONIC SS-70) [component (F)]. A uniform aqueous emulsion was produced by stirring and mixing the components in the same mixer as in Practical Example 1 operating at 5000 rpm. The electric current measured during stirring was 0.7 A.

Practical Example 4

100 parts of a 0.5% aqueous solution of a sodium polyacrylate used in Practical Example 1 [component (E)] were combined with 1.0 part of a fumed silica having a specific surface area of 200 m²/g [component (B)], and 80 parts of borosilicate micro-balloons having a particle average diameter of 45 μm [component (D)]. A uniform aqueous dispersion was then prepared by stirring and mixing the components under the same conditions and with the same homomixer as in Practical Example 1. Furthermore, the obtained aqueous dispersion was combined with 100 parts of a dimethylpolysiloxane capped at both molecular terminals with dimethylvinylsiloxy groups and having a viscosity of 7,000 mPas (vinyl group content: 0.30%) [component (A)], 2.5 parts of a higher alcohol type non-ionic type surface-active agent having 10.5 HLB (SANNONIC SS50) [component (F)], and 2.5 parts of a higher alcohol type non-ionic type surface-active agent having 10.5 HLB (SANNONIC SS-70) mentioned in Practical Example 3 [component (F)]. A uniform aqueous emulsion was produced by stirring and mixing the components in the same mixer as in Practical Example 1 operating at 5000 rpm. The current measured during stirring was 0.7 A. The emulsion had high stability, and the borosilicate micro-balloons did not float up over a long period of time.

Practical Example 5

50 parts of a 0.5% aqueous solution of a sodium polyacrylate used in Practical Example 1 [component (E)] were combined with 10 parts of a fumed silica having a specific surface area of 200 m²/g [component (B)], 0.5 part of carbon black for use as a pigment, 0.7 part of a higher-alcohol type non-ionic surface-active agent having HLB of 10.5 (SANNONIC SS-50, the product of Sanyo Chemical Industries, Ltd.) [component (F)], 0.7 part of a higher-alcohol type non-ionic surface-active agent having HLB of 12.8 (SANNONIC SS-70, the product of Sanyo Chemical Industries, Ltd.) [component (F)], and 3.6 parts of a polyoxyethylene dioleate having HLB of 6.6 [component (F)]. A uniform aqueous dispersion was then produced by stirring and mixing the components for 5 min. in a T.K. homomixer of the MARK II 2.5 type operating at 5000 rpm. The dispersion was combined with 100 parts of a dimethylpolysiloxane capped at both molecular terminals with dimethylvinylsiloxy groups and having a viscosity of 10,000 mPa·s (vinyl group content: 0.14%) [component (A)], and an aqueous emulsion was produced by stirring and mixing the components in the T.K. homomixer of the MARK II 2.5 type at 5000 rpm.

A plastic container was then filled with the following components: the aforementioned aqueous emulsion; 0.5 part of a dimethylsiloxane•methylhydrogensiloxane copolymer capped at both molecular terminals with trimethylsiloxy groups (the content of silicon-bonded hydrogen atoms was 0.8%); 0.1 part of a complex of chloroplatinic acid and divinyltetramethyldisiloxane (concentration of platinum was 0.4%) [component (G)], and 0.1 part of 3,5-dimethyl-1-hexyn-3-ol (an addition reaction inhibitor) per 100 parts of the dimethylsiloxane•methylvinylsiloxane copolymer capped at both molecular terminals with trimethylsiloxy groups contained in the aforementioned aqueous emulsion. The components were manually stirred, and the mixture was deaerated with the use of a vacuum pump. The deaerated aqueous emulsion was used for printing on a polyester fabric through a 60-mesh screen. The printed product was placed for 10 min. into a 100° C. hot-air circulation type oven where it was dehydrated and cured. As a result, a tightly adhered silicone rubber film was formed on the surface of the fabric.

INDUSTRIAL APPLICABILITY

Since the method of the invention for the production of silicone rubber in the aforementioned first and second stages allows decrease of the load on a mixer in the first stage of stirring and mixing, and curing directly after the preparation of the aqueous emulsion in the second stage, the proposed method is suitable for the manufacture of silicone rubber products of different shapes, functions, and applications.

Since the method of the invention for preparation of silicone rubber emulsion for manufacture of silicone rubber is carried out with a reduced load on a mixer during stirring and mixing and since the obtained aqueous emulsion of the invention possesses excellent uniformity and stability, the emulsion is suitable for the manufacture of silicone rubber.

The invention claimed is:

1. A method of manufacturing a silicone rubber, said method comprising:
   a first stage comprising
   (1-1) the step of preparing an aqueous dispersion of a filler composed of 10 to 300 part by weight of water that contains a water-soluble polymer (E), 1 to 40 part by weight of a finely powdered silica filler (B), 0 to 500 part by weight of a conductive filler (C), and 0 to 500 part by weight of a non-conductive inorganic filler (D) excluding the finely powdered silica filler, where the total amount of components (B), (C), and (D) is within the range of 1 to 500 part by weight; and
   (1-2) the step of preparing an aqueous emulsion by stirring and mixing in an arbitrary sequence the aforementioned aqueous dispersion of a filler with the following components: 100 part by weight of an organopolysiloxane (A) that contains in one molecule at least two silicon-bonded alkenyl groups and that has a viscosity of 100 to 500,000 mPa·s at 25° C.; 0.1 to 10 part by weight of an emulsification agent (F); and a curing agent (G); and
   a second stage for obtaining the silicone rubber, the second stage comprising
   (2-1) curing the aqueous emulsion prepared in the aforementioned first stage, forming a wet silicone rubber-like cured body, and then removing water from the aforementioned wet silicone rubber-like cured body; or
   (2-2) dehydrating and curing the aqueous emulsion prepared in the aforementioned first stage.

2. The method of manufacturing a silicone rubber according to claim 1, wherein said step (1-2) is further defined as:
   the step of preparing an aqueous emulsion by adding 100 part by weight of component (A), 0.1 to 10 part by weight of component (F), and component (G) to the aforementioned aqueous dispersion of the filler and then stirring and mixing the components; or
   the step of preparing an aqueous emulsion by adding 100 part by weight of component (A) and 0.1 to 10 part by weight of component (F) to the aforementioned dispersion of the filler, stuffing and mixing the components, adding to the mixture component (G), and then again stirring and mixing the components.

3. A method of manufacturing a silicone rubber, said method comprising:
   a first stage comprising
   (3-1) the step of preparing an aqueous dispersion of a filler composed of 10 to 300 part by weight of water that contains a water-soluble polymer (E), 1 to 40 part by weight of a finely powdered silica filler (B), 0 to 500 part by weight of a conductive filler (C), and 0 to 500 part by weight of a non-conductive inorganic filler (D) excluding the finely powdered silica filler, where the total amount of components (B), (C), and (D) is within the range of 1 to 500 part by weight, and 0.1 to 10 part by weight of an emulsification agent (F); and
   (3-2) the step of preparing an aqueous emulsion by stirring and mixing in an arbitrary sequence the aforementioned aqueous dispersion of a filler with the following components: 100 part by weight of an organopolysiloxane (A) that contains in one molecule at least two silicon-bonded alkenyl groups and that has a viscosity of 100 to 500,000 mPa·s at 25° C.; and a curing agent (G); and
   a second stage for obtaining the silicone rubber, the second stage comprising
   (2-1) curing the aqueous emulsion prepared in the aforementioned first stage, forming a wet silicone rubber-like cured body, and then removing water from the aforementioned wet silicone rubber-like cured body; or
   (2-2) dehydrating and curing the aqueous emulsion prepared in the aforementioned first stage.

4. The method of manufacturing a silicone rubber according to claim 1, wherein said water-soluble polymer that is contained in component (E) is added in the amount of 0.1 to 5 wt. %.

5. The method of manufacturing a silicone rubber according to claim 1, wherein said emulsification agent (F) is a non-ionic surface-active agent.

6. The method of manufacturing a silicone rubber according to claim 1, wherein said curing agent (G) comprises a platinum-type catalyst jointly used with an organopolysiloxane having silicon-bonded hydrogen atoms.

7. The method of manufacturing a silicone rubber according to claim 1, wherein the aqueous emulsion produced in the first stage is cured after deaeration.

8. A method of preparing an aqueous emulsion for use in the production of a silicone rubber, said method comprising:
   (1-1) the step of preparing an aqueous dispersion of a filler composed of 10 to 300 part by weight of water that contains a water-soluble polymer (E), 1 to 40 part by weight of a finely powdered silica filler (B), 0 to 500 part by weight of a conductive filler (C), and 0 to 500 part by weight of a non-conductive inorganic filler (D) excluding the finely powdered silica filler, where the total amount of components (B), (C), and (D) is within the range of 1 to 500 part by weight; and
   (1-2) the step of preparing an aqueous emulsion by stirring and mixing in an arbitrary sequence the aforementioned aqueous dispersion of a filler with the following components: 100 part by weight of an organopolysiloxane (A) that contains in one molecule at least two silicon-bonded alkenyl groups and that has a viscosity of 100 to 500,000 mPa·s at 25° C.; 0.1 to 10 part by weight of an emulsification agent (F); and a curing agent (G).

9. A method of preparing an aqueous emulsion for use in the production of a silicone rubber, said method comprising:
   (3-1) the step of preparing an aqueous dispersion of a filler composed of 10 to 300 part by weight of water that contains a water-soluble polymer (E), 1 to 40 part by weight of a finely powdered silica filler (B), 0 to 500 part by weight of a conductive filler (C), 0 to 500 part by weight of a non-conductive inorganic filler (D) excluding the finely powdered silica filler, where the total amount of components (B), (C), and (D) is within the range of 1 to 500 part by weight, and 0.1 to 10 part by weight of an emulsification agent (F); and (3-2) the step of preparing an aqueous emulsion by stirring and mixing in an arbitrary sequence the aforementioned aqueous dispersion of a filler with the following components: 100 part by weight of an organopolysiloxane (A) that contains in one molecule at least two silicon-bonded alkenyl groups and that has a viscosity of 100 to 500,000 mPa·s at 25° C.; and a curing agent (G).

10. The method of preparing an aqueous emulsion for use in the production of a silicone rubber according to claim 8, wherein said water-soluble polymer that is contained in component (E) is added in the amount of 0.1 to 5 wt. %.

11. The method of preparing an aqueous emulsion for use in the production of a silicone rubber according to claim 8, wherein said emulsification agent (F) is a non-ionic surface-active agent.

12. The method of preparing an aqueous emulsion for use in the production of a silicone rubber according to claim 8, wherein said curing agent (G) comprises a platinum-type catalyst jointly used with an organopolysiloxane having silicon-bonded hydrogen atoms.

13. The method of manufacturing a silicone rubber according to claim 3, wherein said water-soluble polymer that is contained in component (E) is added in the amount of 0.1 to 5 wt. %.

14. The method of manufacturing a silicone rubber according to claim 3, wherein said emulsification agent (F) is a non-ionic surface-active agent.

15. The method of manufacturing a silicone rubber according to claim 3, wherein said curing agent (G) comprises a platinum-type catalyst jointly used with an organopolysiloxane having silicon-bonded hydrogen atoms.

16. The method of manufacturing a silicone rubber according to claim 3, wherein the aqueous emulsion produced in the first stage is cured after deaeration.

17. The method of manufacturing a silicone rubber according to claim 1 wherein the water-soluble polymer of component (E) increases the viscosity of water in which the water-soluble polymer is dissolved.

18. The method of manufacturing a silicone rubber according to claim 17 wherein the emulsification agent (F) is a non-ionic surfactant.

\* \* \* \* \*

UNITED STATES PATENT AND TRADEMARK OFFICE
CERTIFICATE OF CORRECTION

| | | |
|---|---|---|
| PATENT NO. | : 7,683,125 B2 | Page 1 of 1 |
| APPLICATION NO. | : 10/546746 | |
| DATED | : March 23, 2010 | |
| INVENTOR(S) | : Shinya Shirasaki et al. | |

It is certified that error appears in the above-identified patent and that said Letters Patent is hereby corrected as shown below:

In column 13, line 59 Claim 2, delete "stuffing" and replace with -- stirring --.

Signed and Sealed this

Thirteenth Day of July, 2010

David J. Kappos
*Director of the United States Patent and Trademark Office*